United States Patent [19]

Koleske et al.

[11] 4,076,674

[45] Feb. 28, 1978

[54] BLENDS OF AQUEOUS ACRYLIC LATEX AND WATER SOLUBLE CARBOXYL MODIFIED POLYCAPROLACTONE ADDUCT

[75] Inventors: Joseph Victor Koleske, Charleston; Oliver Wendell Smith, South Charleston, both of W. Va.

[73] Assignee: Union Carbide Corporation, New York, N.Y.

[21] Appl. No.: 690,354

[22] Filed: May 26, 1976

[51] Int. Cl.² ............................................. C08L 61/28
[52] U.S. Cl. ..................... 260/29.4 UA; 260/29.6 NR
[58] Field of Search .............. 260/29.4 UA, 29.6 NR, 260/29.6 R; 428/502, 425, 458

[56] References Cited

U.S. PATENT DOCUMENTS

| 3,408,421 | 10/1968 | Kurka | 260/830 |
| 3,775,354 | 11/1973 | Hostettler et al. | 260/78.3 R |
| 3,896,303 | 7/1975 | Gerkin | 260/78.3 R |

OTHER PUBLICATIONS

Chem. Abstracts vol. 78, No. 16, Apr. 23, 1973 (112777a) p. 77.

*Primary Examiner*—Theodore E. Pertilla
*Attorney, Agent, or Firm*—Francis M. Fazio

[57] ABSTRACT

Latex compositions are obtained having improved properties comprising an acrylic latex and a water soluble, carboxyl modified oligomer as adduct reaction product. These adducts are produced by initially obtaining a water insoluble product which is (1) the reaction product of a polycaprolactone polyol and an anhydride of a polycarboxylic acid; or (2) the reaction product of a polycaprolactone polyol, a polyisocyanate and an anhydride of a polycarboxylic acid; or (3) the reaction product of a polycaprolactone polyol, a diepoxide and an anhydride of a polycarboxylic acid. In producing either of the above three types of adducts or products the polycaprolactone polyol used has an average of at least two hydroxyl groups in the molecule, a hydroxyl number of from about 15 to about 600 and an average molecular weight of from about 290 to about 6,000. The carboxylic acid anhydride has at least one intramolecular carboxylic anhydride group. These water insoluble adducts on reaction with an inorganic or organic base are converted to water soluble, carboxyl modified oligomer or adduct reaction products present in our latex compositions.

21 Claims, No Drawings

BLENDS OF AQUEOUS ACRYLIC LATEX AND WATER SOLUBLE CARBOXYL MODIFIED POLYCAPROLACTONE ADDUCT

BACKGROUND OF THE INVENTION

Governmental regulations have placed ever increasing restrictions on the amounts and type of organic volatiles permitted to escape into the atmosphere from coatings compositions. Considerable efforts have been expended to develop coatings compositions having a minimal amount of volatile organic components and this has led to development of powder coatings, radiation curable coatings, latexes and water borne coatings. In these recent developments the amounts of organic solvents present are minimal and consequently there is little or no atmospheric pollution.

The use of latexes in the industrial coatings area has not found wide acceptance due to their low gloss characteristics and problems related to their application on to a substrate. The present compositions provide latex coatings essentially free or organic solvents that can be readily applied by conventional application techniques. Thus, they not only serve to lower atmospheric pollution but they also produce good satisfactory coating compositions.

SUMMARY OF THE INVENTION

It has now been found that certain water soluble carboxyl modified polycaprolactone derivatives or adducts can be used in acrylic latexes for the production of water borne latex coatings compositions. These water soluble polycaprolactone derivatives added to the latexes are obtained (1) by reacting a polycaprolactone polyol and an anhydride of a polycarboxylic acid to produce a carboxyl modified polycaprolactone adduct which is generally water insoluble; or (2) by reacting a polycaprolactone polyol, a polyisocyanate and an anhydride of a polycarboxylic acid to produce a carboxyl modified polycaprolactone urethane adduct which is generally water insoluble; or (3) by reacting a polycaprolactone polyol, a diepoxide and an anhydride of a polycarboxylic acid to produce a carboxyl modified polycaprolactone-epoxide adduct which is generally water insoluble. These adducts are converted to the water soluble form by reaction with an organic or organic base. The water soluble adducts or modified oligomer addition reaction products resulting are then formulated with acrylic latexes into coatings compositions of this invention of improved properties. The preferred coatings compositions are those that additionally contain a crosslinker. The improved latex coatings compositions are then applied in conventional manner and thermally cured to dry film coatings.

DESCRIPTION OF THE INVENTION

The water soluble carboxyl modified polycaprolactone adducts that are blended alone or in combination with the acrylic latexes to produce the coatings compositions of this invention are of three types, as hereinafter identified.

Type (1) are the water soluble carboxyl modified polycaprolactone adduct reaction product mixtures produced by the reaction of a polycaprolactone polyol and an intramolecular anhydride of a polycarboxylic acid, neutralized by reaction with a base.

Type (2) are the water soluble carboxyl modified polycaprolactone urethane adduct reaction product mixtures produced by the reaction of a polycaprolactone polyol, a polyisocyanate and an intramolecular anhydride of a polycarboxylic acid, neutralized by reaction with a base.

Type (3) are the water soluble carboxyl modified polycaprolactone-epoxide adduct reaction product mixtures produced by the reaction of a polycaprolactone polyol, a diepoxide and an intramolecular anhydride of a polycarboxylic acid, neutralized by reaction with a base.

As starting materials for producing the three types of adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols used can be single compounds or mixtures of compounds and either can be used for the production of the adducts. The method for producing the polycaprolactone polyols is of no consequence and the organic functional initiators can be polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkylenoxy units in the molecule, 3 methyl-1-5-pentanediol, cyclohexanediol, 4,4'-methylene-bis-cyclohexanol, 4,4'-isopropylidene biscyclohexanol, xylenediol, 2-(4 hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentaerythritol, N,N,N,N'-tetrakis-(2-hydroxyethyl)ethylene diamine, and the like.

When the organic functional initiator is reacted with the caprolactone a reaction occurs that can be represented in its simplest form by the equation:

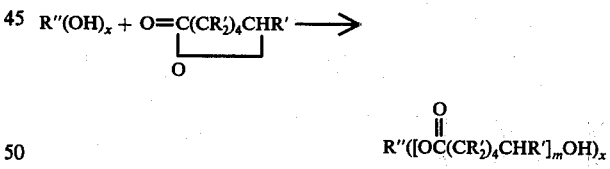

In this equation the organic functional initiator is the R''—(OH)$_x$ compound and the caprolactone is the $$O = C(CR'_2)_4CHR'$$
$$\vert \underline{\hspace{2em}} \vert$$
$$O$$

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from about 290 to about 500 and the polycaprolactone triol compounds having an average molecular weight of from about 300 to about 1,000; these are most preferred because of their low viscosity properties. In the formula m is an integer representing the average number of repeating units needed to produce the compounds having said molecular weights. The hydroxyl number of the polycaprolactone polyol can be from about 15 to 600 preferably from 200 to 500; and the polycaprolactone can have an average of from 2 to 6, preferably 2 to 4 hydroxyl groups.

Illustrative of polycaprolactone polyols that can be used as starting materials in this invention one can mention the reaction products of a polyhydroxyl compound having an average of from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and the polycaprolactone polyol one can readily determine the average number of molecules of caprolactone (CPL Units) that reacted to produce the compound; this figure is shown in the third column.

POLYCAPROLACTONE POLYOLS

| | Initiator | Average MW of polyol | Average No. of CPL units in molecules |
|---|---|---|---|
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

* = Average molecular weight of glycol.

The structures of the compounds in the above tabulation are obvious to one skilled in the art based on the information given. The structure of compound No. 7 is:

wherein the variable r is an integer, the sum or $r + r$ has an average value of 3.7 and the average molecular weight is 527. The structure of compound No. 20 is:

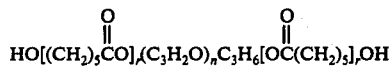

wherein the sum of $r + r$ has an average value of 6 and the average molecular weight is 1,684. This explanation makes explicit the structural formulas of compounds 1 to 34 set forth above.

In producing the adducts of types (1) (2) and (3) a polycarboxylic acid anhydride is used as one of the reactants. Illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

For the preparation of Type (1) carboxyl modified polycaprolactone adducts the amount of polycarboxylic acid anhydride reacted with the polycaprolactone polyol can be an amount sufficient to permit reaction with all of the hydroxyl groups; however, it is preferred to use an amount which is insufficient to react with all of the hydroxyl groups present in the polycaprolactone polyol. This amount will vary and can be from 0.1 to 1 anhydride equivalent for each hydroxyl equivalent or group present in the polycaprolactone polyol initially charged to the reaction mixture and is preferably from 0.1 to 0.4. In a most preferred instance one anhydride equivalent or anhydride moiety is charged for each nine hydroxyl equivalents or groups initially present in the reaction mixture.

The polycaprolactone polyols are reacted with the polycarboxylic acid anhydride at a temperature of about 75° to 200° C., preferably about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 175° C. is adequate to produce the initial water insoluble carboxyl modified oligomer addition reaction product obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomer or adducts are water insoluble but solvent soluble.

For the preparation of the Type (2) polycaprolactone urethane adducts, there is required in addition to the above-defined polycaprolactone polyols and polycarboxylic anhydrides a polyisocyanate.

The polyisocyanates that can be used in this invention are well known to those skilled in the art and should not require detailed description herein. Any of the polyisocyanates can be used alone or in admixture with other isocyanates including the monoisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m-, and p-chlorophenyl isocyanates, benzyl isocyanate, naphthyl isocyanate, o-ethylphenyl isocyanate, the dichlorophenyl isocyanates, methyl isocyanate, butyl isocyanate, n-propyl isocyanate, octadecyl isocyanate, 3,5,5-trimethyl-1-isocyanato-3-isocyanatomethylcyclohexane, di(2-isocyanatoethyl)-bicyclo(2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4''-triisocyanate triphenyl methane, diphenylene-4,4-diisocyanate, the polymethylene polyphenylisocyanates, as well as any of the other organic isocyanates known to the average skilled chemist.

The amount of isocyanate used can be an amount sufficient to permit reaction of the isocyanato group with up to about 0.9 equivalent of the total number of hydroxyl equivalents present. Thus, from 0.025 to 0.9 isocyanato equivalent is reacted per hydroxyl equivalent, preferably from 0.04 to 0.5 isocyanato equivalent per hydroxyl equivalent, and most preferably from 0.04 to 0.25 isocyanato equivalent per hydroxyl equivalent initially charged.

The amount of polycarboxylic acid anhydride reacted with the polycaprolactone polyol can be an amount sufficient to react with all the residual unreacted hydroxyl groups; however, it is preferred to use an amount which is insufficient to react with all of the residual hydroxyl groups present in the polycaprolactone polyol after its reaction with the isocyanate. This amount will vary and can be from 0.1 to 1 anhydride equivalent for each unreacted hydroxyl equivalent or group present in the polycaprolactone derivative in the reaction mixture. It is preferably from 0.1 to 0.4 and, in a most preferred instance, one anhydride equivalent or anhydride moiety is charged for each nine unreacted hydroxyl equivalents or groups present in the reaction mixture.

The reaction temperature when the isocyanate derivative is initially reacted with the polycaprolactone polyol can be from about room temperature to about 75° C. The temperature is then raised when this urethane derivative is subsequently reacted with the polycarboxylic acid anhydride and this temperature is the same as that which is used when all three components are initially charged together. The reaction of any mixture with the anhydride is carried out at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified urethane oligomer addition reaction product obtained by the reaction of these intermediates.

The water insoluble urethane adduct formed at this stage of the reaction is a viscous liquid in most instances. However, in some instances the product may solidify upon standing for an extended period of time. This, however, does not detract from its further utility. Generally these carboxyl modified urethane oligomers or adducts are water insoluble but solvent soluble.

For the preparation of the Type (3) polycaprolactone-epoxide adducts, there is required in addition to the above-defined polycaprolactone polyols and polycarboxylic anhydrides a diepoxide.

The diepoxides that can be used in this invention are well known to those skilled in the art and are fully described in U.S. Pat. No. 3,027,357, U.S. Pat. No. 2,890,194 and U.S. Pat. No. 2,890,197. Of particular interest is that portion of U.S. Pat. No. 3,027,357 beginning at column 4, line 11 to column 7, line 38, which portion and disclosure is specifically incorporated herein by reference. Among some of the specific illustrative diepoxides disclosed therein one can mention 3,4-epoxycyclohexylmethyl-3,4-epoxycyclohexane carboxylate, bis(3,4-epoxy-6-methylcyclohexylmethyl)adipate, bis(2,3-epoxycyclopentyl)ether, vinyl cyclohexene dioxide, 2-(3,4-epoxycyclohexyl)-5,5-spiro-(2,3-epoxycyclohexane)-m-dioxane, bis(3,4-epoxycyclohexylmethyl)adipate, and the like.

The amount of polycarboxylic acid anhydride reacted with the polycaprolactone polyol is an amount which is insufficient to react with all of the hydroxyl groups initially present in the polycaprolactone polyol or formed in the polycaprolactone-epoxide adduct. This amount will vary and can be from 0.1 to about 0.5 anhydride equivalent for each unreacted hydroxyl equivalent or group present in the polycaprolactone portion of the reaction mixture.

The reactions are conducted at a temperature of from about 75° to 200° C., preferably from about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 120 minutes at from about 125° to 175° C. is adequate to produce the initial water insoluble carboxyl modified polycaprolactone-epoxide oligomer addition reaction product obtained by the reaction of the intermediates.

The water insoluble polycaprolactone-epoxide adduct formed at this stage of the reaction is a viscous liquid in most instances. However, in some instances the product may solidify upon standing for an extended period of time. This, however, does not detract from its further utility. Generaly these modified polycaprolactone-epoxide oligomers or adducts are water insoluble but solvent soluble.

The water insoluble Type (1), Type (2) and Type (3) precursor adducts described above are converted to water soluble form ot Type (1), (2) and (3) by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N-N-diethyl ethanolamine, N,N-dimethyl propanolamine, triethanolamine, diethyl-amine, triisopropanolamine, monoethanolamine, diethanolamine, mono-isopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably from 7 to 9.

Reaction with the amine produces products or adducts which are predominantly water soluble. These water soluble adduct are eminently suitable for formulation with the aqueous latexes to produce the compositions of this invention. While applicants have not fully established the structures of the adducts present in the Types (1), (2) and (3) adducts reaction product mixture, it has been theorized that the reaction can proceed along the following routes; however, the reaction product is a complex mixture of components.

Type (1) Reaction Scheme

Step 1

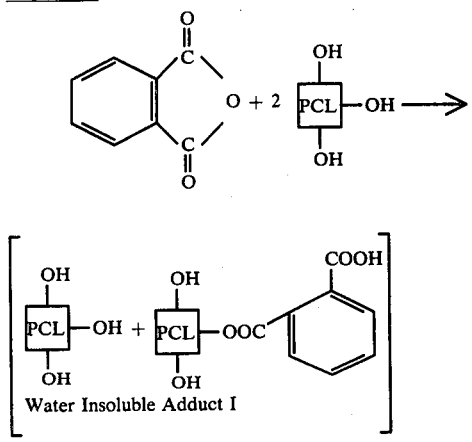

Step 2

Water Insoluble Adduct I + CH$_3$N(CH$_2$CH$_2$OH)$_2$ →

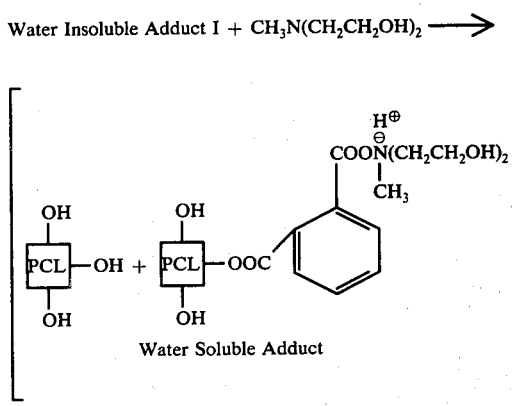

Type (2) Reaction Scheme

Step 1

OCNRNCO + 3 [PCL]—OH →

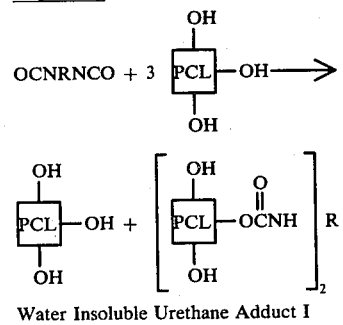

Water Insoluble Urethane Adduct I

Step 2

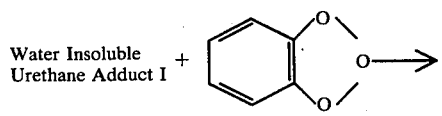

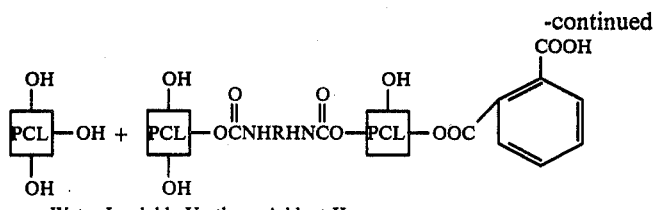
Water Insoluble Urethane Adduct II

Step 3

Water Insoluble Urethane Adduct II + R'$_3$N ⟶

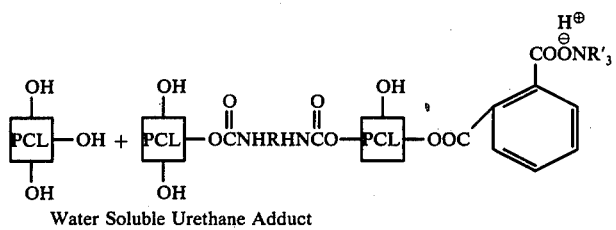
Water Soluble Urethane Adduct

Type (3) Reaction Schemes

Route 1

Step 1

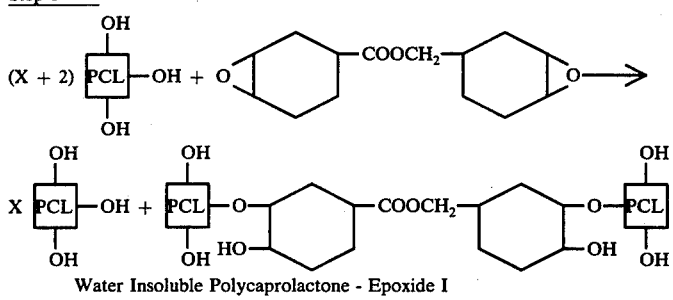
Water Insoluble Polycaprolactone - Epoxide I

Step 2

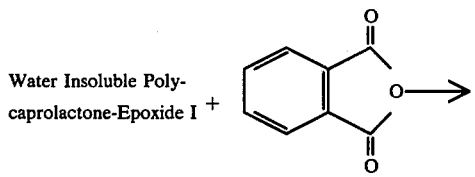

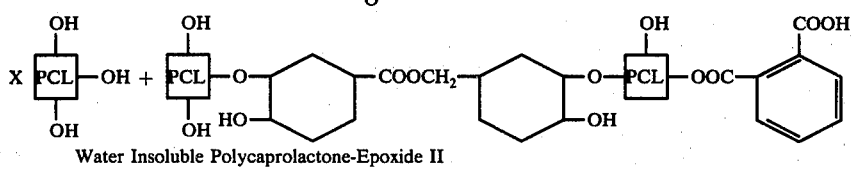
Water Insoluble Polycaprolactone-Epoxide II

Step 3

Water Insoluble Polycaprolactone-Epoxide II + R'$_3$N ⟶

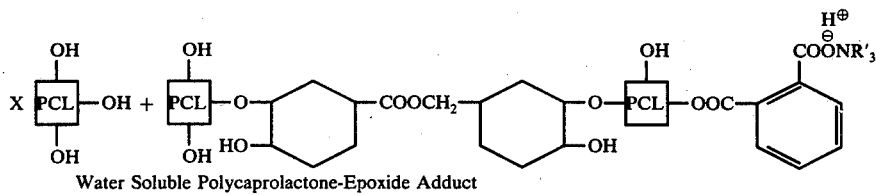
Water Soluble Polycaprolactone-Epoxide Adduct

Route 2

Step 1

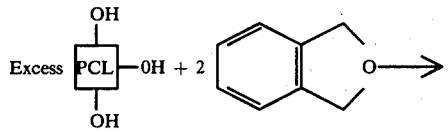

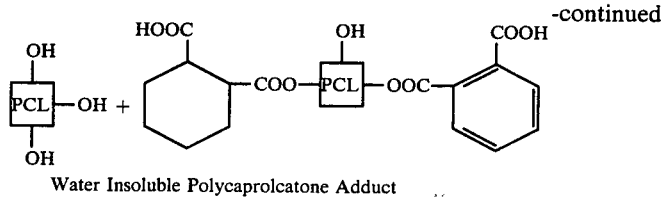

Water Insoluble Polycaprolcatone Adduct

Step 2

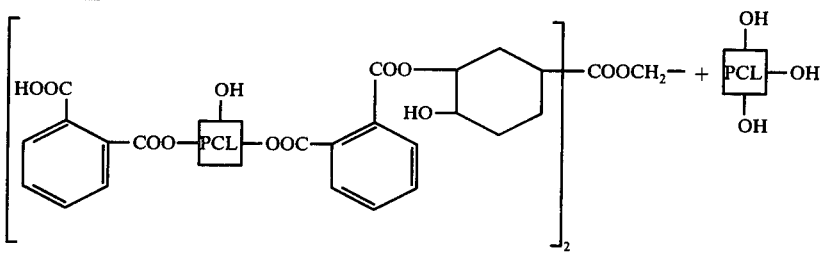

Water Insoluble Polycaprolactone-Epoxide I

Step 3

Water Insoluble Poly-
caprolactone-Epoxide I + R'$_3$N $\longrightarrow$

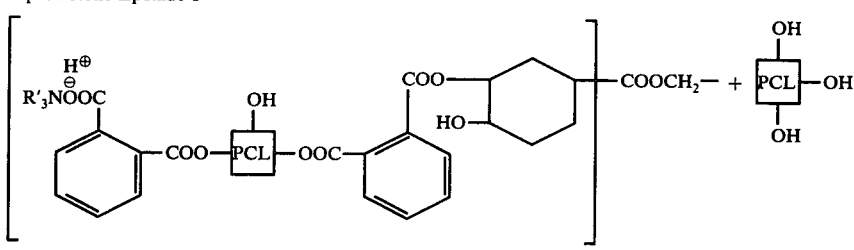

Water Soluble Polycaprolactone-Epoxide

In the above reaction schemes the unit

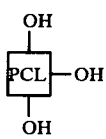

represents a polycaprolactone triol, OCNRNCO represents a diisocyanate, X is an integer having a value of 0 to 4 and R'$_3$N is a tertiary amine. In some instances, depending upon the amount of anhyride used in the reaction, the amount of water used to prepare a clear aqueous solution of the adducts may be restricted before evidence of insolubilization is noted. While this theoretical explanation is presented, applicants do not intend to be found by any theory.

In a typical reaction for the production of the Type (1) adducts one normally charges a polycaprolactone polyol and the polycarboxylic acid anhydride to a reaction vessel and heats the mixture to a temperature of from about 125° to 175° C. for a period of about 20 to 30 minutes. This produces a water insoluble carboxyl modified oligomer or adduct. This water insoluble adduct is then neutralized with the base or amine at any convenient temperature and there is obtained a carboxyl modified oligomer or adduct as previously described.

In a typical embodiment of the production of the Type (2) adducts one can react the polycaprolactone polyol and the polyisocyanate at a temperature up to about 75° C and then add the carboxylic acid anhydride and react at 75° C to 200° C to produce the water insoluble urethane adduct. This is then reacted or neutralized with a base or amine at any convenient temperature and there is obtained the water soluble polycaprolactone urethane adduct. In a second embodiment all of the reactants are initially charged together and the reaction is heated and completed at a temperature of from 75° C to 200° C.

It is customary to use any of the known urethane-forming reaction catalysts during the isocyanate reaction with the polyol. These are well known and any of the catalysts can be used. Illustrative thereof are dibutyltin dilaurate, stannous octoate, triethylene diamine, triethylamine, the known tin salt catalysts, and the like.

In a typical embodiment for the production of the Type (3) adducts according to Route I, one can react the polycaprolactone polyol with the diepoxide at the indicated temperature to produce the Water Insoluble polycaprolactone-Epoxide I or variants thereof. In some instances one may wish to react up to two of the hydroxyl on each polycaprolactone triol. This intermediate compound is then reacted in Step 2 with a carboxylic acid anhydride to form the second Water Insoluble Polycaprolactone-Epoxide II shown above. Finally, this latter compound is reacted with an amine in Step 3 to yield the Water Soluble Polycaprolactone-Epoxide Adduct shown.

In a typical embodiment according to Route II, one can initially react the polycaprolactone polyol with a carboxylic acid anhydride to obtain the Water Insoluble Polycaprolactone Adduct shown in Step 1. This derivative is then reacted, as shown in Step 2, with the diepoxide to produce the Water Insoluble Polycaprolactone-Epoxide Adduct I. Finally, this latter compound is reacted with an amine in Step 3 to produce the Water Soluble Polycaprolactone-Epoxide.

In the schematics shown above specific ratios and compounds were employed for illustrative purposes only. It is apparent, in view of our complete description, that these can be modified within the ranges disclosed in this application.

As is known, catalysts are used during the reaction of the diepoxide with the carboxyl group. The suitable catalysts for use in this invention are those conventionally used and the amounts are also known to those skilled in the art. Illustrative thereof one can mention stannous octoate, benzildimethylamine, tris(dimethylaminomethyl)phenol, triethylenediamine, tributylphosphine, triethylamine, uranyl nitrate hexahydrate, and the like.

The water soluble polycaprolactone derivatives or adducts of Types (1), (2) and (3) prepared above can be used in conjunction with a latex to produce the coatings compositions of this invention. The coatings can also be modified in known manner by the addition of pigments, fillers and other additives conventionally added to latex coating compositions. In any instance the latex coatings are applied to a surface by the conventional means and then thermally cured either alone or in the presence of a crosslinker. It is preferred, however, to have a crosslinker present and in such instances the known catalyst for expediting the crosslinking reaction are generally added. The particular pigment or colorants added to the coating compositions are immaterial and any of the known conventional ones can be used. The amount of crosslinker present in the coating composition can vary from 25 to 200 weight percent preferably 50 to 100 weight percent, based on the weight of the type (1), (2) or (3) adduct present in the latex composition. Among the suitable crosslinkers are the urea formaldehyde aminoplasts, the hexamethoxymethyl melamines, and the known water dispersible transethers thereof with lower alkanols, benzoguanamine, acrylamide resins, as well as any of the other well known crosslinkers of the amine type.

Catalysts are generally present to catalyze a melamine or amine cure system and these are also well known. Among the common catalysts are the mineral acids such as hydrochloric acid or sulphuric acid, paratoluene sulphonic acid, dodecylbenzene sulphonic acid, phosphoric acid, maleic acid, trimelletic acid, phthalic acid, succinic acid, and the like. Also useful are the half esters of the anhydrides of said acids. It is known that the stronger the acidity, the better the catalytic activity.

The latexes that are formulated with the Type (1), (2) or (3) adducts, which adducts can be used singly or in combination, are known to those skilled in the art and include acrylic acid and methacrylic acid derived latexes as well as those latexes derived from their esters. These latexes are commercially available and are known to be copolymers of two or more monomers such as methyl methacrylate, styrene, methyl acrylate, ethyl acrylate, butyl acrylate, 2-ethylhexyl acrylate, butyl methacrylate, methacrylic acid, acrylic acid, 2-hydroxyethyl acrylate, vinyl chloride, vinyl acetate, acrylamide, 2-hydroxypropyl acrylate, isobutoxymethyl acrylamide, maleic acid, glycidyl acrylate, vinylidene chloride, vinyl ethyl ether, butadiene, acrylonitrile, diethyl maleate, vinyl ethyl ketone, and the like. Illustrative of copolymer latexes are vinyl chloride/vinylacetate/methacrylic acid, styrene/ethyl acrylate/methacrylic acid, methyl acrylate/styrene/vinyl acetate/methacrylic acid, and any other known latex.

The amount of Type (1), (2) or (3) adduct added to the latex can vary from about 5 to about 50 weight percent, based on the total solids content of the latex, preferably from 10 to 20 weight percent. It is added to the latex and stirred in by conventional means to obtain uniform distribution therein. The latex formulation can also contain other components generally present in latex coating compositions, such as, surfactants, antifoams, bactericides, mildewicides, other coalescing aids, freeze-thaw additives, light stabilizers, and the like. These are well known to those skilled in the art, as are the amounts thereof required in latex coatings, and do not need extensive description or discussion herein to enable one skilled in the art to understand their use.

The latex coating compositions are applied to a substrate by the known conventional methods. They are cured by heating at a temperature of about 125° to 250° C, preferaby from 150° to 200° C. for a period of time sufficient to obtain a dry film. Generally, this time will range from about one to 30 minutes, preferably from 10 to 20 minutes. The components present in a particular latex coating composition used will determine the temperature and time that will be required to obtain an adequate cure and a good film coating.

The coatings compositions were evaluated according to the following procedures. Crosshatch adhesion refers to a test using 10 parallel single edge razor blades to scribe test films with 2 sets of perpendicular lines on a crosshatch pattern. Ratings are based on the amount of film removed after applying and subsequently pulling a contact adhesive tape (Scotch Brand 606) away from the surface of the scribed coating at a 90 degree angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of acetone soaked cheesecloth required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is recorded as the films reverse-impact resistance.

In this application the following definitions describe the particular compounds that are used in the examples:

Polyol A is a polycaprolactone triol having an average molecular weight of 540 and an average hydroxyl number of 310.

Polyol B is a polycaprolactone triol having an average molecular weight of 300 and an average hydroxyl number of 560.

Polyol C is the reaction product of a mixture of Polyols A and B reacted with 3,4-epoxycyclohexylmethyl-3,4-epoxycyclohexane carboxylate said polyol having a hydroxyl number of about 340 and an average molecular weight of about 900.

also recorded. The results are reported in the following table:

| Ex. | Cure Time 350° F, min. | Reverse Impact in-lb. | Crosshatch Adhesion, %Pass | Acetone Rubs, Cycles | Pencil Hardness | Appearance One Hour After Casting, Before Cure |
|---|---|---|---|---|---|---|
| 2 | 5 | >320 | 0 | 2 | <6B | Slight haze |
| 2 | 10 | >320 | 90 | 8 | <6B | Slight haze |
| 3 | 5 | 275 | 100 | >100 | H | Slight haze |
| 3 | 10 | 200 | 100 | >100 | 3H | Slight haze |
| 4 | 5 | 275 | 99 | 99 | 6B | clear |
| 4 | 10 | >320 | 100 | 100 | 4B | clear |
| 5 | 5 | >320 | 99 | 99 | 2H | clear |
| 5 | 10 | >320 | 100 | 100 | H | clear |
| 6 | 5 | >320 | 100 | 100 | F | clear |
| 6 | 10 | >320 | 100 | 100 | H | clear |
| 7 | 5 | >320 | 100 | 100 | F | clear |
| 7 | 10 | 50 | 100 | 100 | HB | clear |
| A | 5 | <5 | 99 | 5 | 2B | powdery |
| A | 10 | <5 | 99 | 4 | H | powdery |
| B | 5 | | 100 | | | clear |
| B | 10 | | 100 | | | clear |

Latex A is a styrene/ethyl acrylate/methacrylic acid/2-hydroxyethyl acrylate latex having a total solids content of about 40 weight percent.

Latex B is a mixture of 67 weight percent of a methyl methacrylate/butyl acrylate/methacrylic acid copolymer and 33 weight percent of hexamethoxymethylmelamine latex composition having a total solids content of about 45 weight percent.

The following Examples further serve to define this invention.

EXAMPLE 1

To a reaction vessel equipped with a stirrer, thermometer and inert gas purge tube there were charged 324 grams of Polyol A and 26 grams of phthalic anhydride and the mixture was heated at 130° C. for 30 minutes. There was produced a carboxyl modified oligomer adduct reaction product having an acid number of 29 mg. KOH/gram and a Brookfield viscosity of 3,800 cps. at 25° C. This adduct was water insoluble.

EXAMPLES 2 to 7

The adduct produced in Example 1 was used to produce a series of coating compositions. In these coating compositions an aqueous latex was modified to improve its film-forming properties by the addition of the adduct of Example 1 as a coalescing agent. These formulas were produced by mixing the components described in the following table at room temperature.

| Examples | 2 | 3 | 4 | 5 | 6 | 7 | Controls A | B |
|---|---|---|---|---|---|---|---|---|
| Latex A | 24 | 24 | 24 | 24 | 24 | 24 | 24 | 24 |
| Adduct of Ex. 1 | 10 | 10 | 5 | 5 | 2.5 | 2 | 0 | 0 |
| N-Methyl diethanolamine | 0.5 | 0.5 | 0.25 | 0.25 | 0.13 | 0.1 | 0 | 0.75 |
| Cymel 303 | 0 | 6 | 0 | 3 | 1.5 | 1.2 | 0 | 3 |
| Butoxy ethanol | 0 | 0 | 0 | 0 | 0 | 0 | 0 | 5 |
| Water | 6.7 | 6.7 | 3.3 | 3.3 | 1.7 | 1.3 | 0 | 0 |

The addition of the amine to the formulation converts the water insoluble adduct of Example 1 to a water soluble composition. The formulations compositions were coated on to steel panels using a No. 40 wire wound rod and after standing at room temperature for at least one hour the coatings were cured at 350° F. for 5 and 10 minute periods and the cured coatings were then evaluated. The appearance of the coating after standing at room temperature for at least one hour was The results show that the formulations of this invention containing the water soluble carboxyl modified oligomer adduct reaction product produced films having satisfactory properties. In these compositions the coalescing aid becomes part of the coating and is not lost during the cure cycle as is often the case with prior equivalent materials.

EXAMPLE 8

A reaction flask equipped as described in Example 1 was charged with 360 grams of Polyol B and 40 grams of maleic anhydride. After reacting for 5 minutes at 130° C., 20 grams of 3,4-epoxycyclohexylmethyl-3,4-epoxycyclohexane carboxylate and 0.5 gram of stannous octoate were added and the reaction mixture was stirred at 130° C. for 25 minutes. There was produced a water insoluble liquid carboxyl modified oligomer addition reaction product having an acid number of 44 mg. KOH/gram, 0.28 weight percent oxirane groups and a Brookfield viscosity of 11,700 cps. at 25° C.

A series of coating compositions was produced containing Latex A, the reaction product mixture described above and the other components identified in the following table. These coating compositions were applied to steel panels using a No. 60 wire wound rod and allowed to stand at room temperature for 60 minutes. The dry film coatings were then evaluated.

| Formulation | A | B | C |
|---|---|---|---|
| Latex A | 10 | 10 | 10 |
| Adduct | 2.5 | 0 | 0 |
| *Hexamethoxymethyl melamine | 0 | 4 | 0 |
| Ethoxyethyl acetate | 0 | 2.5 | 0 |
| Dimethyl ethanolamine | 0.2 | 0.2 | 0.2 |
| Water | 2 | 2 | 2 |
| Film appearance | glossy | glossy | powdery |

*Methylol group content of about 1.5 weight percent

EXAMPLE 9

A mixture of 100 grams of Polyol A, 200 grams of Polyol B and 0.28 grams of phthalic anhydride was reacted under nitrogen for 30 minutes at 145° C. as described in Example 1. Then 54 grams of 3,4-epoxycyclohexylmethyl-3,4-epoxycyclohexane carboxylate and 3.5 grams of AMC-2(Cordova Chemical) catalyst for the carboxyl-oxirane reaction were added and heating was continued for another 1.5 hours at 130° C. This reaction product mixture had an oxirane content of 6.9 weight percent and a Brookfield viscosity of 5,680 cps. at 25° C. It was water insoluble.

A series of coating compositions was prepared by formulation as shown in the table below:

| Formulation | A | B | C |
|---|---|---|---|
| Latex B | 10 | 10 | 10 |
| Adduct | 2.5 | 0 | 0 |
| Hexamethoxymethyl melamine | 4 | 4 | 0 |
| Ethoxyethyl acetate | 0 | 2.5 | 0 |
| Dimethyl ethanolamine | 0.2 | 0.2 | 0.2 |

These formulations were coated on to steel panels with a No. 60 wire wound rod. After standing at room temperature for 3 hours the films were examined for coalescence. It was noted that formulation C did not coalesce and the coating dried on the surface in powder form. All of the coated panels were then cured at 350° F. for 20 minutes and evaluated, with the results shown below:

| Formulation | A | B | C |
|---|---|---|---|
| Reverse impact, in/lb. | 125 | 75 | powder |
| Solvent resistance, cycles | 63 | 29 | — |
| Pencil hardness | 3H | 2H | — |
| Crosshatch adhesion,% | 100 | 100 | — |
| Appearance | glossy | glossy | powder |

The coating composition containing the coalescing agent of this invention showed improved hardness, reverse impact, acetone resistance and crosslink density properties than did the coating composition of formulation 2, indicating that it functioned as a reactive coalescing aid and became a part of the molecule. As previously indicated, formulation C remained in the powder form and did not form a satisfactory film coating.

EXAMPLE 10

A mixture of 360 grams of Polyol C and 40 grams of phthalic anhydride was reacted by the procedure described in Example 1 to yield a water insoluble adduct having an acid number of 39 mg. KOH/gram.

The above adduct was reacted with 25 grams of morpholine to produce a water soluble reaction product mixture having a Brookfield viscosity of 1,340 poises at room temperature. A 165 gram portion of this water soluble adduct was mixed in a high speed blender with 135 grams of hexamethoxymethyl melamine having about 5 weight percent methylol groups, 150 grams of titanium dioxide, 1 gram of the adduct of 10.5 moles of ethylene oxide and nonylphenyl, 1.3 grams of Silicone Surfactant I and 45 grams of distilled water. After mixing for 15 minutes the contents were poured into a conventional ball mill and rolled over night.

A 10 gram portion of the pigment grind was blended with 13 grams of hexamethoxymethyl melamine having about 1.5 weight percent methylol groups, 5 grams of water, 0.04 gram of Silicone Surfactant I and 24 grams of Latex A to produce a coating. In this coating composition the water soluble grind served as the coalescing agent. The coating composition was applied to a steel panel with a No. 60 wire wound rod and cured at 350° F. for 20 minutes. The cured films exhibited good hardness, gloss, adhesion and acetone resistance properties.

EXAMPLE 11

A mixture of 300 grams of Polyol A and 0.35 gram of dibutyltin dilaurate was charged to a 500 ml. reaction flask equipped as described in Example 1 and heated to 50° C. There was added over a 30 minutes period, 80 grams of 4,4'-methylene bis(cyclohexyl isocyanate) and at the completion of this reaction 83 grams of phthalic anhydride were added and the mixture heated to 130° C and stirred for 30 minutes. There was produced a water insoluble urethane adduct having an acid number of 75. The product mixture was neutralized with 48 grams of N,N-dimethyl ethanolamine to yield a Water Soluble Urethane Adduct I.

A pigment grind was produced, in a Cowles mixer, containing the following components, by weight:

| Water | 832 |
|---|---|
| Dimethyl ethanolamine | 2 |
| Ethylene glycol | 60 |
| Surfactants | 170 |
| Antifoaming agent | 10 |
| Titanium dioxide | 3,800 |

A 598.5 grams portion of this pigment grind was diluted with 63.4 grams of water, stirred and then added 11.2 grams of dimethyl ethanolamine and 1.056 grams of Latex A. This was stirred for 10 minutes; 161.5 grams of hexamethoxymethylmelamine and 289 grams of water were added and the mixture was stirred for 30 minutes. A 219.5 grams portion was formulated with 7.2 grams of the above Water Soluble Urethane Adduct I (Formulation A); a second similar portion was formulated with 7.2 grams of 2-butoxyethanol (Formulation B). These were compared with unmodified material (Formulation C) by coating on to a steel panel and curing at 350° F. for 20 minutes. The results showed better impact and gloss for the formulation containing Adduct I than with the other formulations, as set forth below:

| Formulation | A | B | C |
|---|---|---|---|
| Impact, in-lb. | | | |
| Front | 100 | 75 | 75 |
| Reverse | 50 | 50 | 50 |
| Gloss, % | | | |
| 20° | 65 | 48 | 38 |
| 60° | 90 | 83 | 83 |

What we claim is:

1. A coating composition comprising a blend of an aqueous acrylic latex and from about 5 to about 50 weight percent, based on the total solids content of said latex, of a water soluble carboxyl modified polycaprolactone adduct selected from the group of:

(Type 1) the water soluble carboxyl modified polycaprolactone adduct reaction product mixture of (i) a polycaprolactone polyol and (ii) from 0.1 to 1 carboxylic anhydride equivalent for each hydroxyl equivalent present in the polycaprolactone polyol of an intramolecular anhydride of a polycarboxylic acid, neutralized with (iii) a base; or (Type 2) the water soluble carboxyl modified polycaprolactone urethane adduct reaction product mixture of (i) a polycaprolactone polyol, (ii) from 0.025 to 0.9 isocyanato equivalent for each initial hydroxyl equivalent present in the polycaprolactone polyol of an organic polyisocyanate, (iii) from 0.1 to 1 carboxylic anhydride equivalent per each unreacted hydroxyl equivalent present of an intramolecular anhydride of a polycarboxylic acid, neutralized with (iv) a base; or (Type 3) the water soluble carboxyl modified polycaprolactone-epoxide adduct reaction product mixture of (i) a polycaprolactone polyol, (ii) from 0.2 to 1 mole of an organic oxirane diepoxide per mole of polycaprolactone polyol initially charged, (iii) from 0.1 to 0.5 carboxylic anhydride equivalent per each unreacted hydroxyl equivalent present of an intramolecular anhydride of a polycarboxylic acid, neutralized with (iv) a base;

wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group; and a crosslinking agent.

2. A coating composition as claimed in claim 1, wherein said polycaprolactone polyol has from 2 to 6 hydroxyl groups.

3. A coating composition as claimed in claim 1, wherein said polycaprolactone polyol has from 2 to 4 hydroxyl groups.

4. A coating composition as claimed in claim 1, wherein said polycaprolactone polyol has an average molecular weight of from 290 to about 3,000.

5. A coating composition as claimed in claim 1, wherein said polycaprolactone polyol is a diol having an average molecular weight of from 290 to about 500.

6. A coating composition as claimed in claim 1, wherein said polycaprolactone polyol is a triol having an average molecular weight of from about 300 to about 1,000.

7. A coating composition as claimed in claim 1, wherein aid polycaprolactone polyol is a mixture of polycaprolactone polyols.

8. A coating composition as claimed in claim 1, wherein said anhydride is phthalic anhydride.

9. A coating composition as claimed in claim 1, wherein said anhydride is maleic anhydride.

10. A coating composition as claimed in claim 1, comprising a blend of an aqueous acrylic latex and from about 10 to 20 weight percent, based on the total solids content of said latex, of water soluble carboxyl modified polycaprolactone adduct reaction product mixture of (i) a polycaprolactone polyol and (ii) from 0.1 to 0.4 carboxylic anhydride equivalent for each hydroxyl equivalent present in the polycaprolactone polyol of an intramolecular anhydride of a polycarboxylic acid, neutralized with (iii) an organic base.

11. A coating composition as claimed in claim 10, wherein said (i) is a polycaprolatone triol having an average molecular weight of 540 and an average hydroxyl number of 310, said (ii) is phthalic anhydride, and said (iii) is N-methyl diethanolamine.

12. A coating composition as claimed in claim 1, comprising a blend of an aqueous acrylic latex and from about 10 to 20 weight percent, based on the total solids content of said latex of a water soluble carboxyl modified polycaprolactone urethane reaction product mixture of (i) a polycaprolactone polyol, (ii) from 0.04 to 0.5 isocyanato equivalent for each initial hydroxyl equivalent present in the polycaprolactone polyol of an organic diisocyanate, (iii) from 0.1 to 0.4 carboxylic anhydride equivalent per each unreacted hydroxyl equivalent present of an intramolecular anhydride of a polycarboxylic acid, neutralized with (iv) an organic base.

13. A coating composition as claimed in claim 12, wherein said (i) is a polycaprolactone triol having an average molecular weight of 540 and an average hydroxyl number of 310, said (ii) is 4,4'-methylene bis(cyclohexylisocyanate), said (iii) is phthalic anhydride, and said (iv) is N,N-dimethyl ethanolamine.

14. A coating composition as claimed in claim 12, wherein said (ii) is present at a concentration of from 0.04 to 0.25 isocyanato equivalent.

15. A coating composition as claimed in claim 1, comprising a blend of an aqueous acrylic latex and from about 10 to 20 weight percent, based on the total solids content of said latex of a water soluble carboxyl modified polycaprolactone-epoxide adduct reaction product mixture of (i) a polycaprolactone polyol, (ii) from 0.3 to 0.6 mole of an organic oxirane diepoxide per mole of polycaprolactone polyol initially charged, (iii) from 0.1 to 0.5 carboxylic anhydride equivalent per each unreacted hydroxyl equivalent present of an intramolecular anhydride of a polycarboxylic acid, neutralized with (iv) an organic base.

16. A coating composition as claimed in claim 15, wherein said (i) is a polycaprolactone triol having an average molecular weight of 300 and an average hydroxyl number of 560, said (ii) is 3,4-epoxycyclohexylmethyl-3,4-epoxycyclohexane carboxylate, said (iii) is maleic anhydride, and said (iv) is N,N-dimethyl ethanolamine.

17. A composition as claimed in claim 1, wherein said latex is a styrene/ethyl acrylate/methacrylic acid/2-hydroxyethyl acrylate copolymer latex and said crosslinking agent is hexamethoxymethylmelamine.

18. A composition as claimed in claim 1, wherein said latex is a methyl methacrylate/butyl acrylate/methacrylic acid copolymer latex and said crosslinking agent is hexamethoxymethylmelamine.

19. A composition as claimed in claim 10, wherein the crosslinking agent is hexamethoxymethylmelamine.

20. A composition as claimed in claim 12, wherein the crosslinking agent is hexamethoxymethylmelamine.

21. A composition as claimed in claim 15, wherein the crosslinking agent is hexamethoxymethylmelamine.

* * * * *